A. C. SETTLAGE.
DUMPING MECHANISM FOR TRUCKS.
APPLICATION FILED JAN. 27, 1916.
1,336,163.
Patented Apr. 6, 1920.
2 SHEETS—SHEET 1.
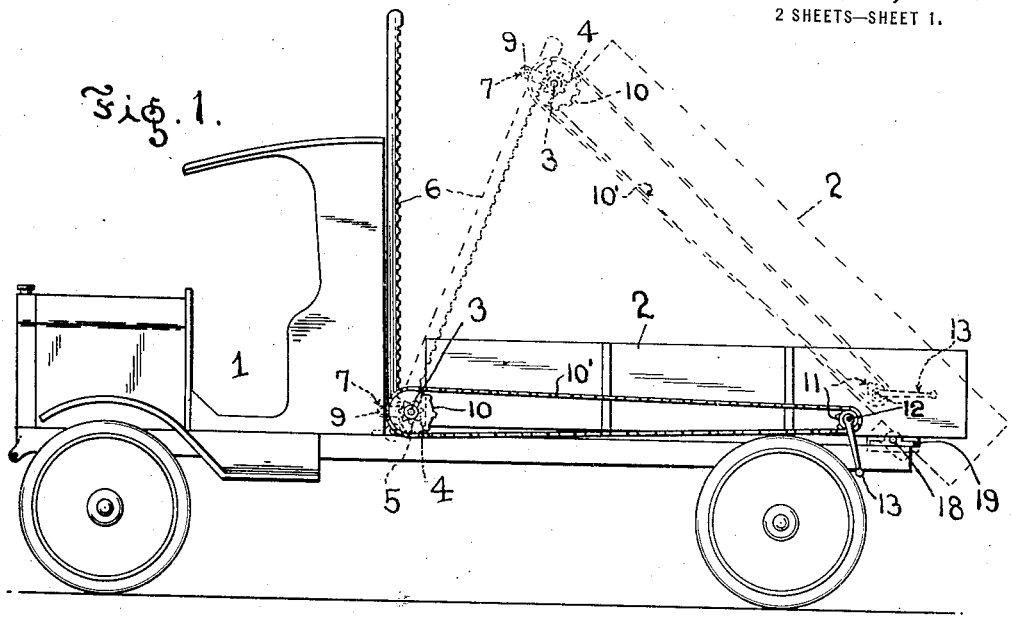
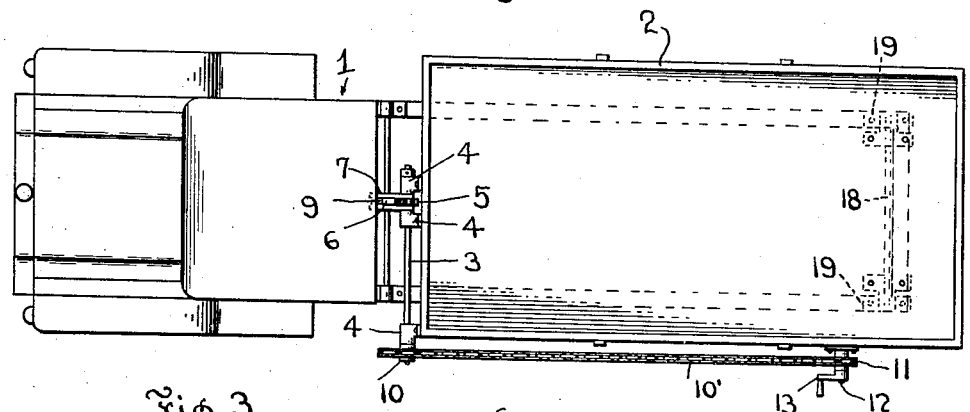
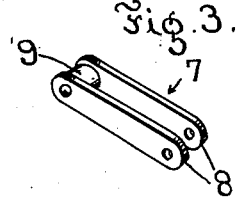
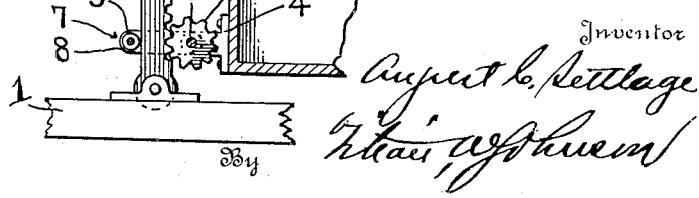

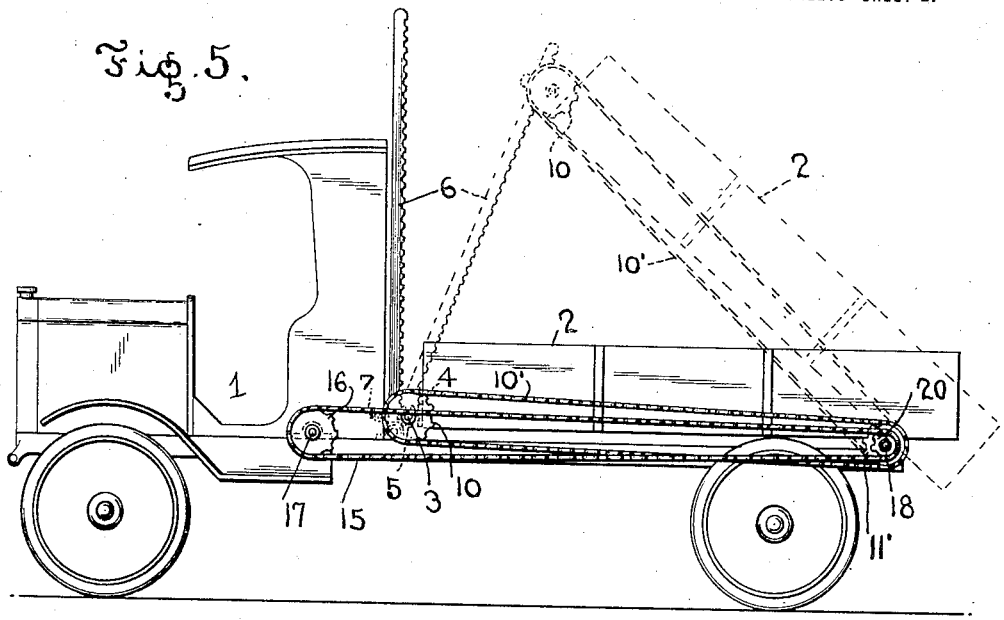
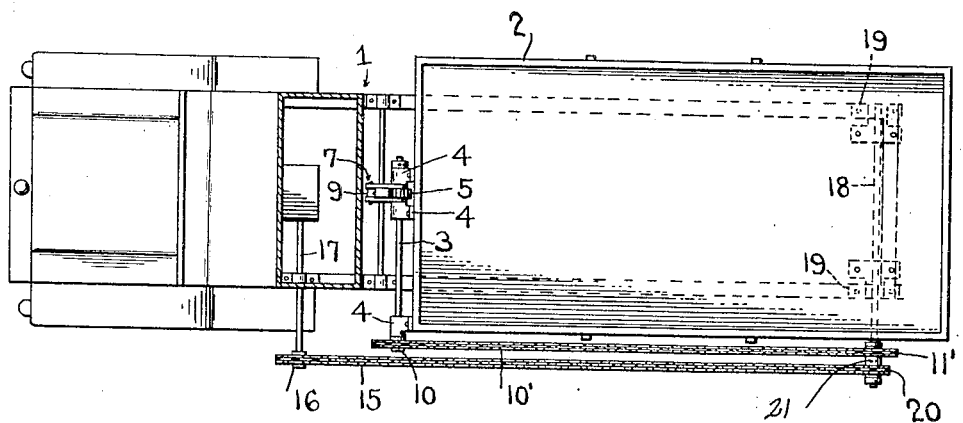

UNITED STATES PATENT OFFICE.

AUGUST C. SETTLAGE, OF NEW BREMEN, OHIO.

DUMPING MECHANISM FOR TRUCKS.

1,336,163.   Specification of Letters Patent.   Patented Apr. 6, 1920.

Application filed January 27, 1916. Serial No. 74,635.

*To all whom it may concern:*

Be it known that I, AUGUST C. SETTLAGE, a citizen of the United States, residing at New Bremen, in the county of Auglaize and State of Ohio, have invented certain new and useful Improvements in Dumping Mechanism for Trucks, of which the following is a specification.

This invention relates to improvements in dumping mechanism for trucks, wagons, etc., and more particularly to a mechanism especially adapted for raising and lowering motor truck bodies.

The invention has for its first and most important object, the provision of a durable and simple mechanism having such construction that will permit the raising and lowering of the body with very considerable ease and rapidity.

A further object is to provide a mechanism that may be operated either manually or by the motive power of the truck and one which is so simple in construction that its parts may be duplicated and proportioned to the size and tonnage of the truck, without undue or unnecessary complication.

In the drawing illustrating the invention,

Figure 1 is a side elevation of a truck constructed in accordance with this invention, the raised position of the body and connected parts being shown in dotted lines;

Fig. 2 is a plan view of the truck;

Fig. 3 is a detail perspective view of the link guide detached;

Fig. 4 is a broken detail showing the manner of attaching the lifting gear to the truck body, and guiding the same on the rack;

Fig. 5 is a side elevation of a modification wherein the motive power of the truck is utilized to raise and lower the body, and Fig. 6 is a plan view of such form.

Referring to the drawings, the numeral 1 designates a truck chassis which may, of course, be of any improved construction. This is provided with a body 2, which may also be of any well known or approved form. The numeral 3 designates a transverse shaft located at the front end of the body, and journaled in bearings 4 securely attached to the body.

Upon this shaft, and preferably at one side thereof, is mounted a gear wheel 5, which meshes with the teeth of a rack bar 6. Loosely mounted upon the shaft 3, is a guide 7, which is formed of two links 8, and between the links at their forward ends is arranged an antifriction roller 9 adapted to run on the smooth side of the rack bar in the operation of raising and lowering the body.

The numeral 10 designates a sprocket fast to the shaft 3, over which passes a sprocket chain 10' which passes over a sprocket pinion 11, mounted upon the stub shaft 12, near the back of the body. To this shaft is connected a crank 13 for use in trucks of comparatively light tonnage, where it is entirely feasible to raise and lower the body manually.

The rack bar 6, which has no connection with the body save that between the lifting gear 5 and the link guide, is rockably mounted in suitable bearings upon the chassis just to the rear of the vehicle.

In the form shown in Fig. 5, the numeral 15 designates a sprocket chain which passes over a sprocket 16 fast upon the end of shaft 17 mounted in suitable bearings upon the front of the frame, which shaft may be provided with suitable clutch and reverse gear, having operative connection with the driving shaft of the engine. This mechanism is not shown, but it will be understood that any approved mechanism of this type, whereby the shaft 17 may be rotated in either direction, may be employed. The chain 15 passes over another sprocket wheel 20 on the shaft 18, journaled in suitable bearings 19 at the rear of the chassis. The sprocket 20 is mounted upon a sleeve 21, loosely mounted on the end of the shaft 18, together with the sprocket 11', so that it is through the rotation of this sleeve, through the chain 10' and sprocket 10, that the chain 10' conveys power to the sprocket 10, and through it to the lifting gear 5.

It is to be understood that any number of rack bars, lifting gears and guides may be employed as required by the character of the work to be performed, as for instance in heavy trucks, it may be desirable to duplicate these parts on both sides of the body and preferably an intermediate set of parts may be employed. It will be noted that the body is rockably mounted upon the transverse shaft 18, supported in the bearings 19 at the rear of the chassis, thus permitting the better movement of the body, and also preventing the body from sliding from the chassis when in raised position, and this arrangement also prevents any torsional strain being placed upon the rack bar in any of the possible positions of the body.

While the operation is doubtless apparent from the following description, nevertheless a short detailed operation follows:

Assuming the body to be in the position shown in Fig. 1, and it is desired to raise it to the position shown in dotted lines, the sprocket wheel 10 is driven, thus rotating gear 5, which will climb the rack 6, the bar meanwhile running between the links of the guide 7, with the antifriction roller 9 running on the smooth side of the rack, causing the bar to be moved from vertical position and to follow the body, as shown in dotted lines. Obviously the reverse movement of the driving mechanism will restore the parts to normal position.

In the form shown in Figs. 5 and 6, the sprocket 16 is driven, imparting motion to the sleeve 21, through the sprocket 20, which in turn, through sprocket 11' drives the chain 10', which drives the shaft 3, causing the lifting gear 5 to operate as has been described.

Having thus described my invention, what I claim is:

1. In a mechanism of the character described, the combination with a suitable frame, a rockable body pivoted upon the frame, two sprockets suitably mounted upon the frame adjacent to the rear end of the body and having a movement in common with each other, a shaft mounted near the front of the body, and carrying a sprocket and a lifting gear, a rack bar pivoted to the frame and in engagement with the lifting gear, a motor mechanism and connections between said mechanism and one of the rear sprockets, whereby both of said sprockets are operated, and connections between the rear and front sprockets for driving the lifting gear, substantially as and for the purpose set forth.

2. In a mechanism of the character described, in combination, a suitable frame, a body pivoted to said frame near the rear end thereof, sprockets suitably mounted upon the frame and having a movement in common with each other, a motor driven shaft, journaled in suitable bearings in the front of the frame and having operative connection with one of the rear sprockets, a shaft journaled in suitable bearings on the front of the body, and also having operative connection with one of the rear sprockets, a lifting gear fast upon the last mentioned shaft, and a rack bar pivoted to the frame and in engagement with the lifting gear, substantially as and for the purpose set forth.

In testimony whereof I affix my signature in presence of two witnesses.

AUGUST C. SETTLAGE.

Witnesses:
AUGUST F. ISERN,
JOHN HENRY GROTHAUS.